United States Patent [19]

Elliott et al.

[11] 4,445,313

[45] May 1, 1984

[54] HAY CUTTING MACHINES

[76] Inventors: Thomas Elliott; Todd Knecht, both of Rd. 5, Box 215, both of Towanda, Pa. 18848

[21] Appl. No.: 409,705

[22] Filed: Aug. 19, 1982

[51] Int. Cl.³ .............................................. A01D 49/00
[52] U.S. Cl. .................................. 56/16.4; 56/DIG. 1
[58] Field of Search ................. 56/DIG. 1, 16.4, 14.4, 56/14.5

[56] References Cited

U.S. PATENT DOCUMENTS

| | | | |
|---|---|---|---|
| 2,811,003 | 10/1957 | Getz | 56/DIG. 1 |
| 3,079,742 | 3/1963 | Balzer | 56/DIG. 1 |
| 3,513,645 | 5/1970 | Garrett et al. | 56/DIG. 1 |
| 4,075,822 | 2/1978 | Heckley et al. | 56/DIG. 1 |
| 4,174,602 | 11/1979 | Webb et al. | 56/DIG. 1 |

*Primary Examiner*—Jay N. Eskovitz
*Attorney, Agent, or Firm*—Michael F. Brown

[57] ABSTRACT

An improvement in mower-conditioners for forage crops such as hay, in which a pair of ribbed rollers is used to crimp the stems of the crop passing between, to promote drying of the crop.

The improvement comprises the use of additional pairs of ribbed rollers, synchronized such that each additional pair of rollers positioned to crimp the crop stems at a different point from the preceding pairs.

6 Claims, 4 Drawing Figures

HAY CUTTING MACHINES

BACKGROUND OF THE INVENTION

1. Field of the Invention

The invention pertains to devices and methods for conditioning hay.

Hay comprises various plants, such as alfalfa, clover, and the like, which are mown and dried for use as animal feed. The hay is conditioned by processing, usually during mowing, to improve its drying characteristics and desirability as feed. Hay produced from leaf crops, such as alfalfa, is conditioned to crack the hard stems so that they dry at the same rate as the softer leaves.

2. Description of the Prior Art

The most common method of conditioning hay is through the use of a pair of conditioning rollers, usually added to a mower to produce a machine which simultaneously cuts and conditions hay, customarily called a "mower-conditioner," if towed by a tractor, or a "windrower" if self-propelled. In this specification, "hay-cutting machine" will be used to mean mower-conditioner, windrowers, or the like. The cut hay passes between the rollers (FIG. 2), which crush the crop stem, permitting escape of moisture from inside the stem and promoting drying. The force or "tension" urging the rollers together is set to accomplish the degree of crushing desired. This presents the problem that the crop may be over-crushed, damaging the leaves, or under-crushed, and thus not conditioned enough.

An improvement upon the conditioning roller is the crimping roller. In a crimping roller system (FIG. 3) the rollers have ribs which crimp the long plant stems at intervals, while leaves pass between the rollers relatively untouched. The ribs extend longitudinally along the length of the rollers, and may be arranged as straight teeth, or in a spiral arrangement. The preferred design is the Chevron Mesh used on Sperry-New Holland Haybine TM conditioners (illustrated in FIG. 3), which has a multiple spiral arrangement in which the ribs form chevrons. The pattern on each roller are oppositely disposed, so that the ribs may intermesh.

Although the ribs of the crimper rollers are a major improvement over the pure conditioning rollers, they still present problems for the farmer. Extremely thick or wet hay often does not feed into the rollers properly and can plug and jam the machine. The same adjustment problems may appear—if the tension on rollers is great enough to thoroughly crimp the stems, the leaves may be stressed too much. If this occurs, the leaves, when dry, will shatter and be lost during further processing. This problem is particularly acute in machines in which the cutting width exceeds the width of the rollers. The large ribs crimp the stems at relatively large intervals, so that the crimping is not as efficient as might be wished.

It is thus an object of the invention to provide a hay cutting machine which effectively conditions the mown hay by crimping the plants more thoroughly than existing machines.

It is a further object of the invention to provide a hay cutting machine which conditions hay with less damage to the hay than produced by current designs.

It is a still further object to provide a hay cutting machine which is less prone to plugging than others presently available.

SUMMARY OF THE INVENTION

The invention pertains to an improved hay cutting machines having more than one set of crimping rollers. The additional sets of rollers are positioned "out of phase" such that the hay stems are crimped at a different point than by the first set. This produces hay which is crimped in more places, possibly with more overall pressure, and thus dries faster with less damage and leaf breakage and loss. The additional sets of rollers reduce plugs by pulling the hay out of the first set.

DESCRIPTION OF THE PREFERRED EMBODIMENT

Figure 1:
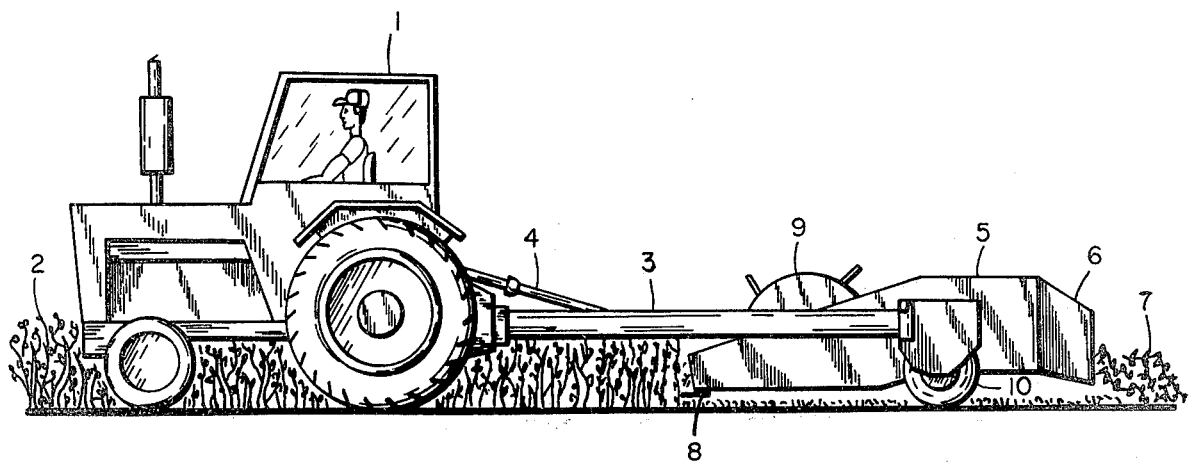
FIG. 1 shows an overall view of the invention in use.

In use, the invention is incorporated into a hay cutting machine. Most commonly (FIG. 1) the hay cutting machine is towed (3) by a tractor (1), rolling on its own wheels (10) although the implement may be self-propelled, or entirely supported by the tractor. Power is provided by a power take off (PTO) shaft (4) or hydraulic connection. The hay cutting machine is propelled through the unmown hay (2), and a cutter (8), which may be a sickle bar or a number of disks, cuts the hay. A reel (9) may be used to comb hay over the cutter (8). The mown hay is conditioned, by crimping or crushing, in the body of the conditioner (5), and is ejected from the rear in a swatch or windrow (7), shaped by swath doors (6). Hay cutting machines of the type shown are marketed or manufactured by New Holland (under the Haybine TM trademark), Hesston, Ford, and others.

Figure 2:
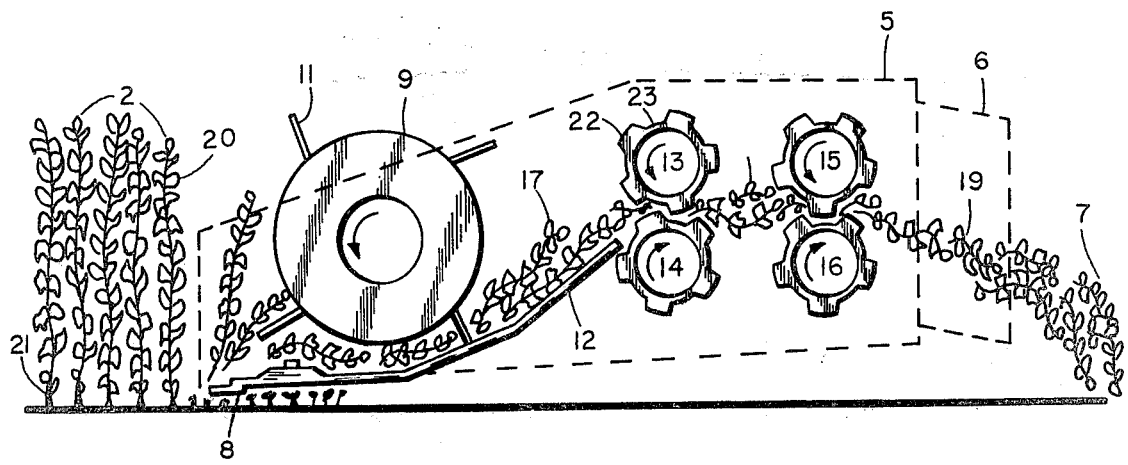
FIG. 2 shows a schematic view of the invention, showing the path of the hay through the conditioner.
Figure 3:
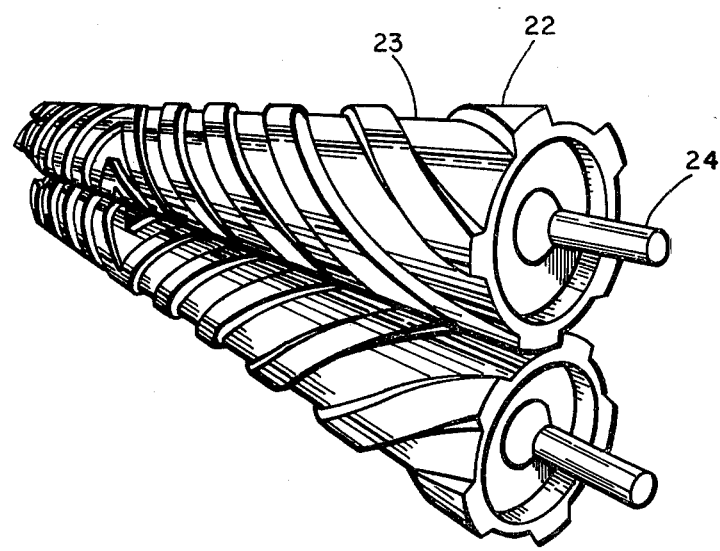
FIG. 3 shows a detail drawing of the single set of the interlocking rollers as used in the preferred embodiment of invention.
Figure 4:
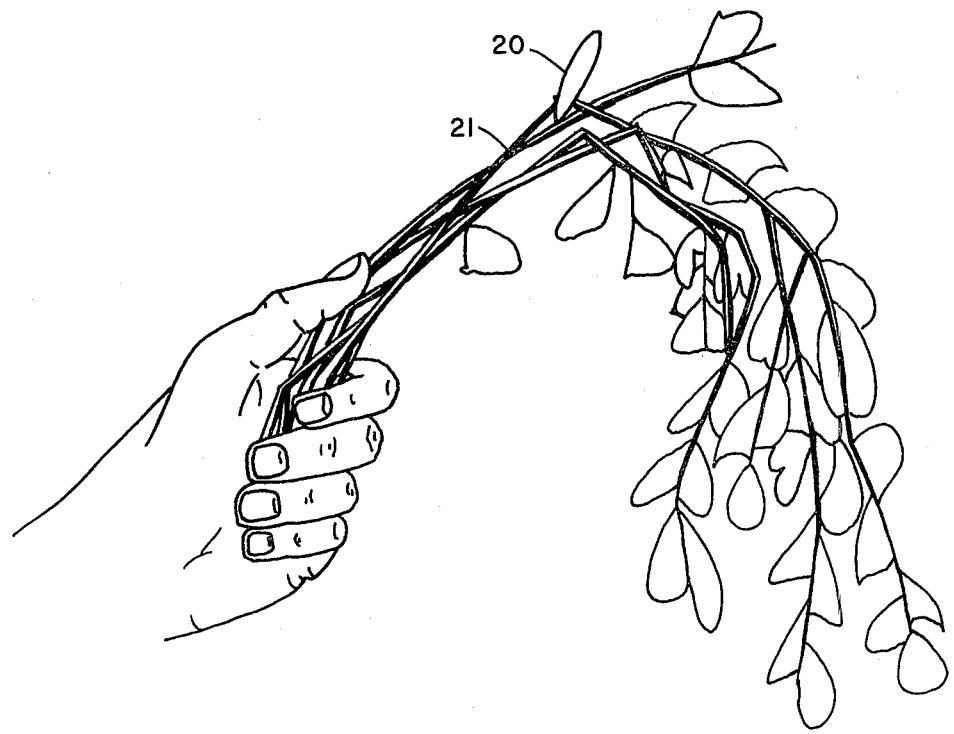
FIG. 4 shows crushed crop.

FIG. 2 shows, schematically, the operation of the invention. At the heart of a hay cutting machine are the conditioning rollers, which are shown in detail in FIG. 3. Preferably, the roller ribs intermesh. However, designs with non-intermeshing ribs may be used, or one non-ribbed roller combined with a ribbed roller. Each roller comprises a body (22) with protruding ribs (23) which extend outward from the body along the length of the roller. The ribs may run straight along the roller, or twist in the nature of a screw, or, preferably, be of the "Chevron Mesh" design used by New Holland, as shown in FIG. 3. As can be seen in the preferred embodiment, the ribs in each of two adjoining rollers intermesh. Alternatively, the ribs may meet each other in synchronization, and not intermesh. The rollers are urged toward each other by a spring or other source of tension. A stop may be included to set the minimum distance between the rollers. The interaction of the ribs on the rollers crimps or breaks the hard stems of the hay at intervals. In current hay cutting machines having a single set of rollers, however, setting the magnitude of the force holding the rollers toward each other high enough to crush the stems (FIG. 4) (21) sufficiently often results in damage to the leaves (20).

The invention adds a second set of conditioning rollers (15, 16) to the single set (13, 14) in current conditioners. This second set of rollers is so positioned that the hay stems are crimped in a different spot along the length of the plant from that crimped by the first set.

Thus, the tension of each set of rollers need not be as great as in a single-roller conditioner to accomplish the same degree of conditioning, resulting in a decrease in damage to the hay. Alternatively, the tension of the rollers can be set to a large value, as used in single-roller conditioners, and a higher degree of conditioning done. FIG. 2 shows the operation of a conditioner according to the teachings of the invention.

The inmown hay (2) is cut off a short distance above the ground by a cutter (8). A reel (9) may be employed to comb the hay back over the cutter (8) with a plurality of bats (11) possibly with fingers attached, as shown. The cut hay (17) moves along a guide (12) to the first pair of conditioning rollers (13) and (14), where the stems (21) are crimped by the ribs (22), as in the prior art.

In windrowers, or other machines in which the width of the rollers is less than that of the cutters, an auger, or other means for guiding the hay, feeds the cut hay to the rollers in the center.

The once-conditioned hay (18) immediately enters a second set of rollers (15), (16), which are positioned such that the ribs crimp the hay at a different point. Additionally, the hay (18) is pulled from the first set of rollers by the second set, which promotes the even flow of hay through the conditioner and reduces the jamming of hay characteristic of prior-art conditioners. The twice-conditioned hay (19) is ejected through swath doors, as in the prior art.

Although the preferred embodiment is illustrated and described above as using a single additional pair of rollers of a specific design, it will be understood that, in fact, a number of additional pairs of any design may be used, each synchronized to the earlier sets so as to crimp the hay at yet another point.

Accordingly, it is to be understood that the embodiments of the invention herein described are merely illustrative of the application of the principles of the invention. Reference herein to details of the illustrated embodiments are not intended to limit the scope of the claims which themselves recite those features which are considered essential to the invention.

We claim:

1. In an improved hay cutting machine for promoting the drying of hay or other forage crops of the type having: means for supporting the hay cutting machine above the ground; means for propelling the hay cutting machine through the crop to be mowed; means for cutting the crop; conditioning means for crimping the crop stems comprising a pair of cylindrical rollers mounted transversely to the direction of crop movement through the conditioner at least one of said rollers having a plurality of longitudinal ribs disposed around the circumference of the roller; tensioning means for urging the pair of rollers toward each other; said cut crop being guided in a stream from the cutting means between the rollers, whereby the crop stems are crimped at intervals along the stems; wherein the improvement comprises:

a plurality of additional pairs of rollers mounted parallel to the said first pair of rollers located such that the stream of cut crop moves immediately from the first pair of rollers through each additional pair of rollers in sequence;

each additional pair of rollers being located along the stream of cut crop in synchronization with the earlier pairs of rollers, whereby the stems of the cut crop are crimped at different points along the stems than the points crimped by the first or earlier additional pairs of rollers.

2. The hay cutting machine of claim 1 in which the longitudinal ribs on each pair of rollers intermesh.

3. The hay cutting machine of claim 2 in which the longitudinal ribs of the rollers are in the form of a spiral oppositely disposed on each roller.

4. The hay cutting machine of claim 2 in which the longitudinal ribs of the rollers form a plurality of chevrons, oppositely disposed on each roller.

5. The hay cutting machine of claim 1 in which the longitudinal ribs of the rollers are in contact.

6. The hay cutting machine of claim 1 in which at least one pair of rollers comprises one roller with ribs and one flat roller without ribs.

* * * * *